United States Patent [19]

Kaplan

[11] 4,208,553
[45] Jun. 17, 1980

[54] TELEPHONE OFFICE ASSIGNMENT VERIFICATION

[75] Inventor: Alan E. Kaplan, Parsippany, N.J.

[73] Assignee: Bell Telephone Laboratories, Incorporated, Murray Hill, N.J.

[21] Appl. No.: 963,025

[22] Filed: Nov. 22, 1978

[51] Int. Cl.³ .................. H04M 3/26; H04B 3/46
[52] U.S. Cl. ......................... 179/175.3 A; 324/66
[58] Field of Search ............... 179/175.3 R, 175.3 A, 179/175.2 R, 175.25, 2 A; 324/66

[56] References Cited

U.S. PATENT DOCUMENTS

| | | | |
|---|---|---|---|
| 2,585,904 | 2/1952 | Busch | 179/18 |
| 2,869,077 | 1/1959 | Houk | 179/175.3 A |
| 3,427,538 | 2/1969 | Bohnenblust | 179/175.3 A |
| 3,559,055 | 1/1971 | Thompson | 179/175.3 A |
| 3,644,687 | 2/1972 | Richards, Jr. | 179/175.3 A |
| 3,902,026 | 8/1975 | Rogers et al. | 179/175.3 A |
| 3,973,090 | 8/1976 | Miller | 179/175.3 A |
| 4,028,507 | 6/1977 | Hoppough | 179/175.3 R |

OTHER PUBLICATIONS

"Computer System for Main-Frame Operations (cosmos)"; 1976, International Conference on Communications, Jun. 14–16, 1976; pp. 13–20:13–22.

*Primary Examiner*—Thomas A. Robinson
*Attorney, Agent, or Firm*—Robert O. Nimtz

[57] ABSTRACT

A testing and recording system is disclosed for determining and recording the cable pair-line equipment assignments in a telephone central office. Using a multipair shoe on the main frame appearances of the cable pair, an off-hook condition is simulated successively on each of a plurality of idle cable pairs. At the same time, the dial tone markers are monitored to determine which line equipment responds to the off-hook condition. If the off-hook test condition is of very brief duration and takes place during times of low central office traffic, there is a high probability that only one off-hook condition will occur during the test interval. If only one dial tone marker response occurs during this brief interval, the cable pair identification and line equipment identification are recorded to create a record of this assignment. Alternatively, a tone associated with each dial tone marker is detected to ascertain which marker responded to the simulated off-hook condition.

12 Claims, 5 Drawing Figures

TELEPHONE OFFICE ASSIGNMENT VERIFICATION

BACKGROUND OF THE INVENTION

1. Field of the Invention

This invention relates to equipment assignment verification systems and, more particularly, to the verification of the assignments of telephone cable pairs to central office switching equipment locations.

2. Description of the Prior Art

In modern telephone central offices it has become common to utilize digital computers and mass storage techniques to maintain a continuously updated record of the assignment of telephone cable pairs to specific locations on the central office equipment. Such records aid in the rapid and error-free reassignment of such facilities in response to changes in subscriber service or changes in central office equipment. One such computer-based system is described in "Computer System for Mainframe Operations (COSMOS)" by B. B. Bittner, published in 1976 *International Conference on Communications*, June 14–16, Philadelphia, Pa., pp. 13-20-13-22.

In order to install such a computer-based system, it is necessary to convert the manually recorded and indexed assignments into digital signals suitable for storage in a digital mass storage medium such as a magnetic disk file. This conversion process is slow, tedious and subject to considerable human error, resulting in computer records which cannot be readily used. It is therefore important to verify the pair-equipment assignments prior to actually utilizing the computer-based system.

In the prior art systems this cable pair-line equipment (or billing telephone number) verification process was accomplished by attaching a test set to the cable pair appearances, going off-hook, waiting for a dial tone response and then dialing up a special access code which connected the cable pair to a test trunk. This test trunk is then used to access the automatic number identification equipment or another test frame. The line billing telephone number and/or line equipment number is pulsed forward to the test trunk by the number identification unit or test frame in the central office. Since the number of the cable pair accessed is already known (by its physical position), the cable pair-equipment and/or billing telephone number relationship is established.

The verification scheme described above, even when accomplished by automatic dialing techniques, requires a considerable amount of time to verify each assignment. In large central offices this verification process therefore extends over a considerable period, delaying the introduction of the computer-based control system.

SUMMARY OF THE INVENTION

In accordance with the illustrative embodiment of the present invention, cable pair-line equipment assignments are verified at an extremely rapid rate by using a test shoe to briefly and sequentially simulate an off-hook condition on a large plurality of cable pair appearances. The simulated off-hook conditions are synchronized with the generation of cable pair identification codes. The dial tone markers in that central office automatically respond to such an off-hook condition with the generation of a line equipment number to which dial tone is to be applied. This line equipment number and the cable pair identification can be recorded, provided that the appropriate dial tone marker can be identified.

For example, if only one off-hook condition occurs during the simulated off-hook condition, the marker is easily identified. In one embodiment, the period of off-hook simulation is therefore made extremely brief (on the order of a few hundred milliseconds) and the testing is done during light traffic periods for the central office (usually late at night). These light traffic periods are normally well known from observation of the traffic flow through the central office. The probability is therefore very high that only a single off-hook will occur during the test period and permit assignment recording. If two or more off-hooks occur during the test period, the test is repeated to determine the assignment of that particular cable pair.

In another illustrative embodiment of the present invention, a unique tone is generated at each dial tone marker and is detected via the test shoe connection. The tone, after detection, is used to gate the line equipment number from the proper dial tone marker. Alternatively, a single tone can be applied at the cable pair appearance, detected at each dial tone marker and then used to select the correct dial tone marker.

It can be seen that the assignment verification system of the present invention is much faster (a few tenths of a second versus possibly ten seconds) than systems of the prior art. It is therefore possible to verify the pair-equipment assignments in a relatively large central office in a very short time and thereby permit an earlier introduction of the computer-based control system. Furthermore, the only manual operation required is the movement and insertion of the multipair shoe, also reducing the total amount of time required for verification.

DETAILED DESCRIPTION

Figure 1:
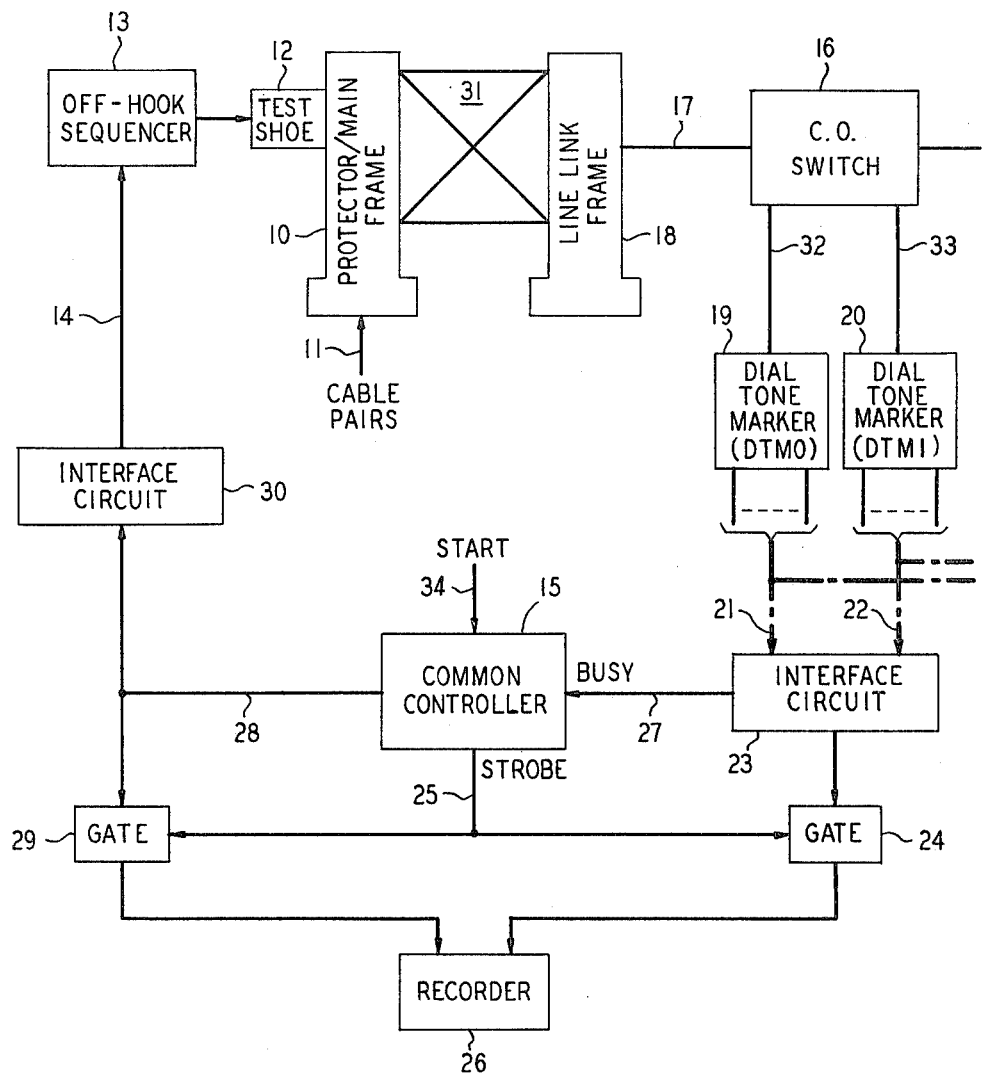
FIG. 1 is a general block diagram of a first embodiment of an assignment verification system in accordance with the present invention.

In FIG. 1 there is shown a general block diagram of one embodiment of an assignment verification system in accordance with the present invention. As can be seen in FIG. 1, a central office frame 10 (the main frame or a protector frame) in a telephone central office serves as a termination for a very large plurality of telephone cable pairs 11.

As is well known in the prior art, frame 10 provides a connector field for terminating a large plurality of cable pairs which can be cross-connected on frame 10. A test shoe 12 can be inserted into the frame 10 so as to make individual connections with a large number of cable pair appearances on the face of frame 10. The test shoe 12, for example, can simultaneously make connections with 50, 100 or 200 cable pair appearances, depending on the frame block type. In accordance with the illustrative embodiment of the present invention, an off-hook sequencer 13 is utilized to successively present a simulated off-hook condition to each idle pair connected to test shoe 12. Sequencer 13 is under the control of cable pair identification signals on lead 14, derived from a common controller 15. Common controller 15 will be described in more detail in connection with FIG. 2.

The cable pair appearances on frame 10 are connected through a central office cross-connection field 31 which may comprise, for example, jumpers which serve to selectively connect any one of the cable pairs 11 to any one of a plurality of equipment locations 17 appearing on line link frame 18. Locations 17 are the access ports to central office switch 16, and thence to other central offices, to dial tone and to busy tone sources or to other special service trunks, as is well-known in the telephone switching art. Each of the equipment appearances on line link frame 18 is assigned a particular equipment number by which it can be identified in records kept in the central office in which the system of FIG. 1 is located. These line equipment numbers and the associated cable pair numbers serve the function of permitting assignment of particular telephone service to the subscribers at the remote ends of cable pairs 11. It is therefore necessary not only to keep an accurate record of these assignments but also to be able to make changes in these assignments as subscribers move within or outside of the local central office area, or change their service requirements. It is the determination and verification of these cable pair-line equipment assignments that are the object of the present invention.

A portion of central office switch 16 comprises a plurality of dial tone markers represented by dial tone markers 19 and 20 in FIG. 1. The number of dial tone markers in each central office depends upon the size of that office and the average traffic level through that office. For simplicity, only two dial tone markers 19 and 20 have been shown in FIG. 1. Alternatively, all but two dial tone markers can be turned down in a central office switching entity (during light traffic conditions). The function of these dial tone markers is to respond to off-hook conditions on the various cable pairs 11 and to generate an identification, appearing on leads 21 and 22, respectively, of the line equipment number associated with that particular off-hook pair. As is well known in the art, the central office switching equipment 16 responds to such an identification code from the dial tone marker by connecting a source of dial tone to the terminals identified by the line equipment number, thereby supplying a dial tone signal to the off-hook subscriber. Note that leads 21 and 22 carry the line equipment number, and not dial tone, to the interface circuit 23. It will be understood that dial tone markers 19 and 20 are shared by a large number of subscribers and perform the dial tone assignment for this large number of subscribers in sequence. For a more detailed description of such a central office, see A. J. Busch U.S. Pat. No. 2,585,904, granted Feb. 19, 1952.

An interface circuit 23 receives the line equipment numbers from dial tone markers 19 and 20 and converts the voltage levels from those necessary to operate relays at the central office battery potential to low level signals suitable for operating electronic gating circuitry. A gate circuit 24, under the control of a strobe signal on lead 25, gates these low level identification signals from interface circuit 23 to a recorder 26 which may, for example, be a magnetic tape recording system. Interface circuit 23 also generates busy signals on leads 27, indicating whether or not each of dial tone markers 19 and 20 has detected an off-hook condition. These busy signals are supplied to common controller 15.

Common controller 15 includes an electronic counter circuit which generates cable pair numbers in sequence on leads 28 and supplied these cable pair numbers to a gating circuit 29 and to an interface circuit 30. Gating circuit 29, under the control of strobe signals on lead 25, gates these pair identification signals into recorder 26 in synchronism with the line equipment numbers supplied through gating circuit 24. Interface circuit 30 serves to translate the low level electronic signals on leads 28 to high level signals on leads 14 suitable for operating the relay circuits in off-hook sequencer 13.

The assignment verification system of FIG. 1 operates as follows: After the test shoe 12 is placed on a plurality of cable pair appearances on frame 10, a START signal is applied by way of lead 34 to common controller 15. Controller 15 sequentially generates cable pair identification codes on lead 28 which, operating through interface circuit 30, enables sequencer 13 to sequentially apply off-hook conditions to idle cable pair appearances connected to test shoe 12. During each brief application of an off-hook condition, the dial tone markers 19 and 20, by means of leads 32 and 33, ascertain which line equipment appearance on frame 18 is connected to the cable pair going off-hook. This line equipment number is supplied via leads 21 or 22 to interface circuit 23. If one and only one off-hook condition occurs during this brief interval, as indicated by the signals on lead 27, common controller 15 generates a strobe signal on lead 25 to gate the line equipment number (via gate 24) and the cable pair identification number (via gate 29) into recorder 26. This simultaneous record of one cable pair identification number and one line equipment identification number provides the necessary assignment information for a computerized data base to maintain and selectively alter these assignments.

Following the strobe signal, common controller 15 sequences to the next cable identification number and repeats the sequence as before. If more than one off-hook condition occurs during this brief interval, common controller 15 does not make a record of the cable pair-line equipment assignment but, instead, repeats the simulation of an off-hook condition on the same cable pair appearance. This simulation is repeated until only one off-hook condition is detected or until a number of unsuccessful attempts have been made. At that time, the record of the assignment is made, if available, and the circuit sequences to the next cable pair appearance.

In accordance with this first illustrative embodiment of the present invention, the off-hook condition is presented for a very brief interval (on the order of a few hundred milliseconds) to minimize the likelihood that more than one off-hook condition will occur during this interval. For the same reason, the assignment verification system of this embodiment can be best used in the late night hours when the traffic load at the central office is at a minimum. It can be shown that, for a test interval of 200 milliseconds and an average number of arrivals of one every ten seconds (typical for light traffic loads), the probability of only a single off-hook condition occurring within the 200-millisecond interval, i.e., no other off-hook conditions, is in excess of 0.98.

This traffic rate is typical for late night hours in reasonably large central offices.

Figure 2:
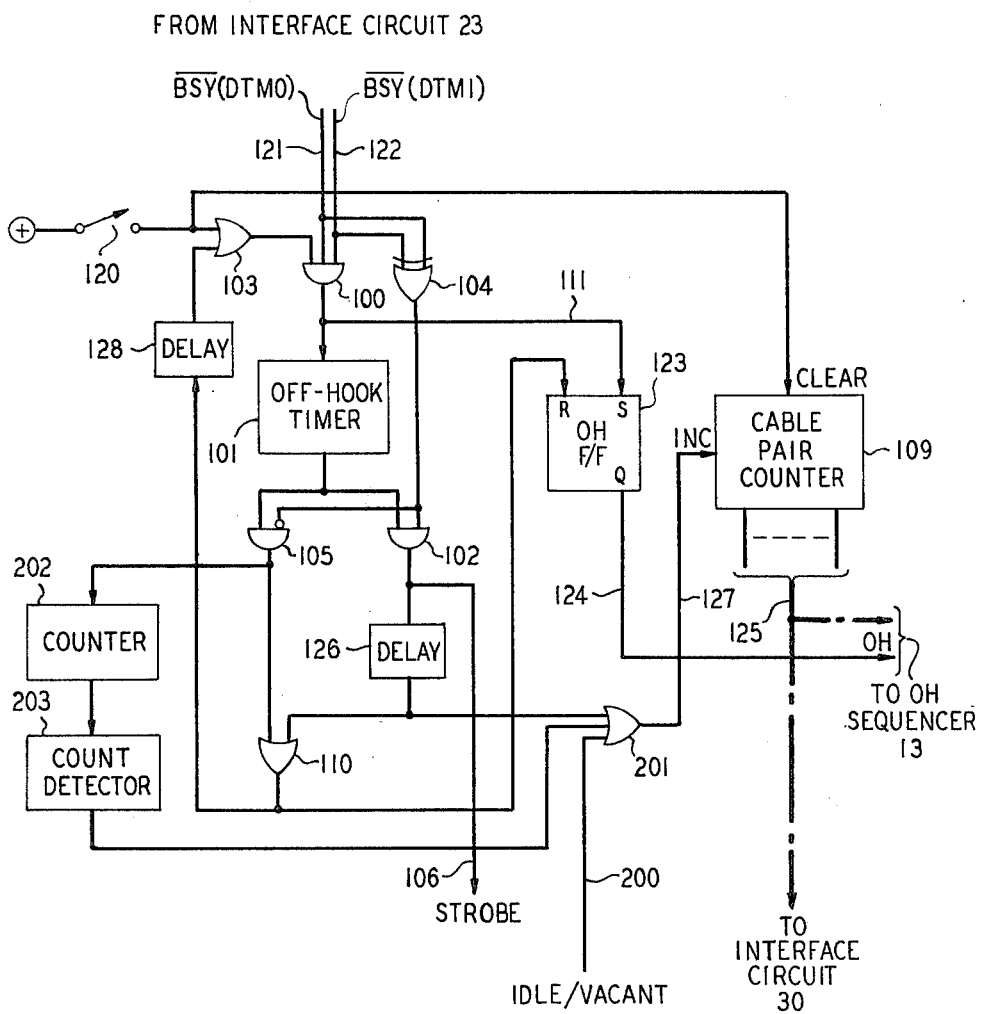
FIG. 2 is a more detailed circuit diagram of a common controller used in the assignment verification system of FIG. 1.

In FIG. 2 there is shown a more detailed circuit diagram of the common controller 15 of FIG. 1. A starting switch 120, when operated, connects an enable voltage to OR gate 103, the output of which is connected to AND gate 100. The signal from switch 120 is also used to clear a cable pair counter circuit 109. Also applied to AND gate 100 are inverted busy signals on leads 121 and 122 from interface circuit 23 of FIG. 1. The signal on lead 121 indicates that dial tone marker 19 in FIG. 1 is not busy, i.e., has not detected an off-hook condition on any of the line equipment appearances on line link frame 18. Similarly, the signal on lead 122 indicates that dial tone marker 20 has not detected an off-hook condition at any of the line equipment appearances on line link frame 18. AND gate 100 is therefore fully enabled only when neither of the dial tone markers 19 and 20 is actively connecting dial tone to an off-hook subscriber.

Only two dial tone markers have been illustrated in connection with FIG. 1. This has been done in order to simplify the logic required in the common control circuits of FIG. 4. While it is obvious how this logic circuit could be extended to more than two dial tone markers, it is also true that, if the central office includes more than two dial tone markers per switching machine, all but two of them can be turned off during the assignment verification period. As previously noted, this verification is best done during light traffic hours when two dial tone markers should be more than adequate to handle the normal traffic.

When AND gate 100 is fully enabled, its output enables off-hook timer 101 which, after a timed period which may be approximately 100 milliseconds, produces an output which is applied to gates 102 and 105. The input of timer 101 is also applied to the "set" input of off-hook flip-flop 123 which, in response thereto, produces an output on lead 124 which initiates an off-hook condition in the off-hook sequencer 13 of FIG. 1. Simultaneously, since counter 109 has been cleared to zero, output leads 125 from counter 109 provide a code which identifies the first cable pair connected to test shoe 12 in FIG. 1. In response to these signals, off-hook sequencer 13, as will be shown in connection with FIG. 3, simulates an off-hook condition on the first cable pair connected to test shoe 12. If the cable pair is busy (indicated by talking current) or if the cable pair is vacant (indicated by the lack of central office battery), a signal on lead 200 is applied through OR gate 201 to increment counter 109. Such busy pairs can be verified manually at a later time.

The signals on leads 121 and 122 are also supplied to exclusive OR gate 104. Gate 104 produces an output if one and only one of the dial tone markers has detected the off-hook condition. The signal from gate 104 is applied simultaneously to gate 102 and to an inhibiting input to gate 105. If gate 102 is fully enabled, a strobe signal is produced on lead 106 which operates gates 24 and 29 in FIG. 1 and gates the cable pair identification code and the line equipment identification code into recorder 26. The signal from gate 102 is also supplied to a delay circuit 126 which, after a brief delay, increments counter 109 via OR gate 201 and lead 127 and, through OR gate 110, resets off-hook flip-flop 123. The off-hook condition is thereby removed from that particular cable pair appearance. The output of gate 110 is also supplied through a delay circuit 128 to OR gate 103. As before, the output of OR gate 103 initiates a new cycle using the new cable pair identification code.

Gate 105, if not inhibited by a signal from gate 104, will, upon the termination of the timing period by timer 101, produce an output to OR gate 110 which resets flip-flop 123 and, through OR gate 103 and delay circuit 128, reinitiates the test for the same cable pair appearance. The output of gate 105 is also applied to a counter circuit 202 which counts the number of unsuccessful verification attempts. If the count in counter 202 exceeds a preselected value (six, for example), count detector 203 detects this count and supplies a signal to OR gate 201 to advance counter 109. In this way, lack of success will not hang up the verification system.

It can be seen that, if more than one off-hook condition is detected during any cycle of the sequencer 13 of FIG. 1, the test is continually repeated until a single off-hook condition occurs or until a number of unsuccessful attempts have been made. As previously noted, the probability of more than one off-hook condition occurring during each brief cycle is extremely low.

It can be seen that the circuits of FIG. 2 serve to control the application of simulated off-hook conditions in sequence to all of the idle cable pair appearances connected to test shoe 12. During each simulated off-hook condition, dial tone markers 19 and 20 are monitored to determine if one and only one off-hook condition is detected during the off-hook simulation. If only one off-hook condition is detected, the cable pair identification code and line equipment identification code are recorded. If more than one off-hook condition occurs during this time period, the test is repeated on the next succeeding cycle and continued repetitiously until one and only one off-hook condition is detected, or until a preselected number of attempts have been made. In this way, virtually all of the assignments of line equipment locations to the cable pairs connected to test shoe 12 can be ascertained automatically and extremely rapidly. When this entire sequence is completed, test shoe 12 is removed and placed across a new set of cable pair appearances on protector frame 10. The process can then be repeated for this new set of cable pair appearances.

Figure 3:
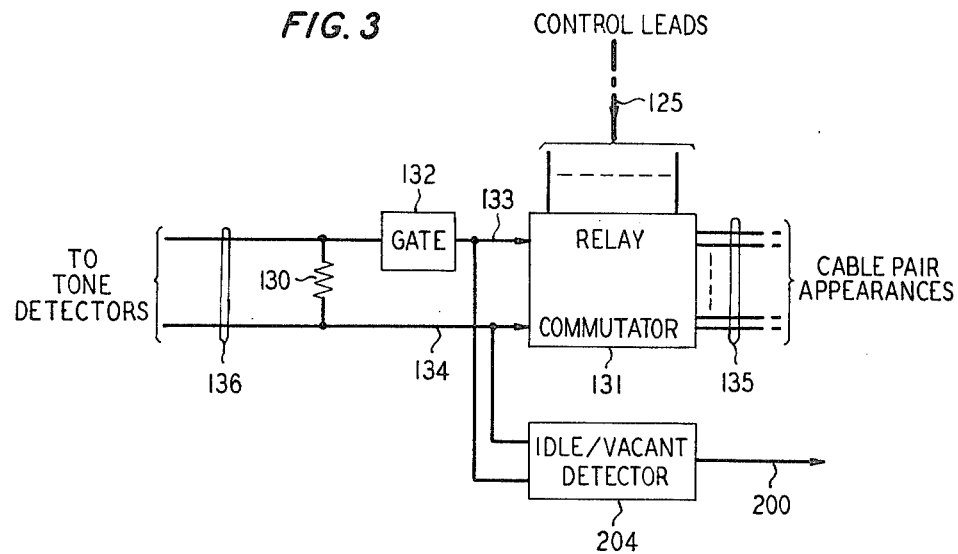
FIG. 3 is a more detailed block diagram of the off-hook sequencing circuits of the assignment verification system of FIG. 1.

Referring to FIG. 3, there is shown a more detailed block diagram of the off-hook sequencer 13 in FIG. 1. The sequencer of FIG. 3 comprises a standard termination 130 which, for example, may be a 600-ohm resistor which is used to simulate the off-hook condition. Resistor 130 is connected to a relay commutator 131 under the control of gate 132. Gate 132, in turn, is under the control of off-hook control signals on lead 124 from off-hook flip-flop 123. Commutator 131 serves to connect the input leads 133 and 134 to the cable pair appearances 135 under the control of cable pair identification codes appearing on leads 125. Such commutators are well known in the art and will not be further described here. Commutator 131 may, for example, comprise an electromechanical stepping switch responsive to the signals on leads 125 to connect a pair of wiper arms to one of the cable pair appearances 135 as directed by the codes on leads 125. An idle/vacant detector circuit 204 is connected between leads 133 and 134 to detect busy pairs (talking current flowing) and vacant pairs (no office battery). Under either of these conditions, detector 204 supplies a signal on lead 200 which causes the controller of FIG. 2 to skip to the next cable pair. A pair of detector leads 136 are connected across resistor 130 which are not used in the embodiment of FIG. 1, but are used, as will be described, in connection with the embodiment of FIG. 4.

Figure 4:
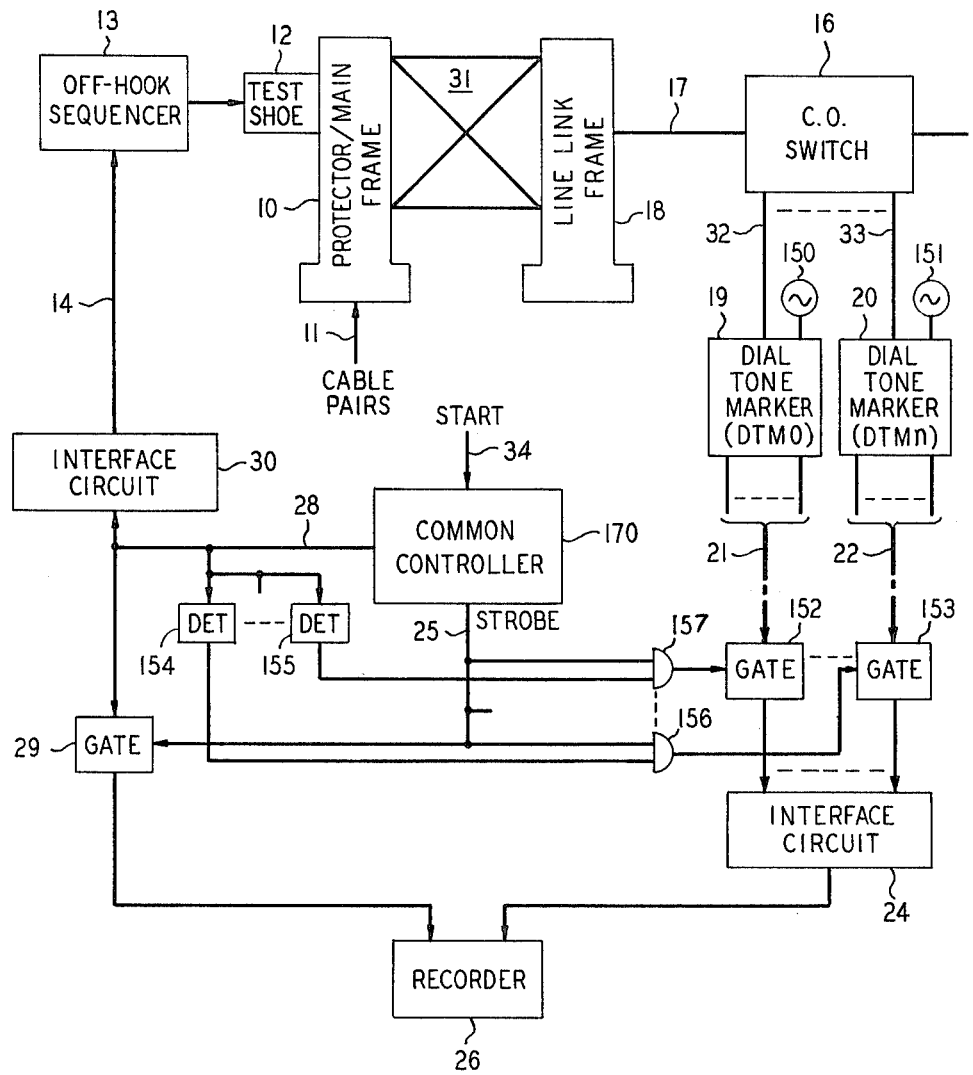
FIG. 4 is a general block diagram of a second embodiment of an assignment verification system in accordance with the present invention.

Referring more particularly to FIG. 4, there is shown a second embodiment of the present invention in which elements corresponding to the elements in FIG. 1 have been identified with the same reference numerals. Thus, a frame 10 in a telephone central office terminates a very large plurality of telephone cable pairs 11. A test shoe 12 can be inserted into frame 10 to make simultaneous connections with a plurality of cable pair appearances on frame 10. Off-hook sequencer 13 successively simulates an off-hook condition across the cable pair appearances on test shoe 12 under the control of pair identification signals on leads 14 derived from common controller 170.

The cable pair appearances on frame 10 are cross-connected to locations 17 on line link frame 18 by means of jumper field 31. A plurality of dial tone markers 19 through 20 identify the line equipment location 17 to which dial tone is to be applied in response to an off-hook condition on the connected cable pair. This equipment identification is supplied, by way of leads 32 through 33, to dial tone markers 19 through 20, respectively. As is well known, the central office switching equipment 16 responds to these identification codes by connecting a source of dial tone to the identified line equipment terminals. Note that dial tone is not used to locate the line equipment number.

In accordance with the present embodiment of the invention, tone sources 150 through 151 are associated with dial tone markers 19 through 20, respectively. The tone signals from sources 150 through 151 are distinguishable in frequency and serve to identify the associated dial tone marker. The dial tone markers connect the tone signal to the equipment appearance 17 on line link frame 18 corresponding to the off-hook cable pair. Conversely, a single tone could be applied at the frame 10 connector and separate tone detectors connected to each dial tone marker. Thus, a spatial rather than a frequency distinction between dial tone markers can be made.

The line equipment identifications are also supplied via leads 21 through 22 to a corresponding set of gates 152 through 153 and, thence, to interface circuit 24 and recorder 26.

Common controller 170 includes a counter which generates cable pair numbers in sequence on leads 28 and supplies these cable pair numbers to a gating circuit 29 and to an interface circuit 30. Gating circuit 29, under the control of strobe signals on lead 25, gates these pair identification signals into recorder 26 in synchronism with the line equipment numbers supplied through interface circuit 24. Interface circuit 30 supplies the pair identification signals to off-hook sequencer 13 via leads 14 to control the application of the off-hook condition.

As can be seen in FIG. 3, sequencer 13 provides a pair of leads 136, which are included in the bundle of leads 14, and which are used to supply a tone signal from one of sources 150 through 151 to a corresponding set of tone detectors 154 through 155. The outputs of detectors 154 through 155 are, in turn, each connected to one input of AND gates 156 through 157, respectively. The strobe signal on lead 25 is connected to the remaining inputs of AND gates 156 and 157. The outputs of AND gates 156 and 157 are, in turn, connected to gates 152 through 153, respectively.

It can be seen that, when one of dial tone markers 19 through 20 responds to an off-hook condition, a tone is supplied on the connection through frames 18 and 10 to the off-hook sequencer 13 and, thence, to detectors 154 through 155. In this way, the responsive one of markers 19 through 20 is identified and the line equipment number on the appropriate one of leads 21 through 22 is gated through interface circuit 24 to recorder 26.

Figure 5:
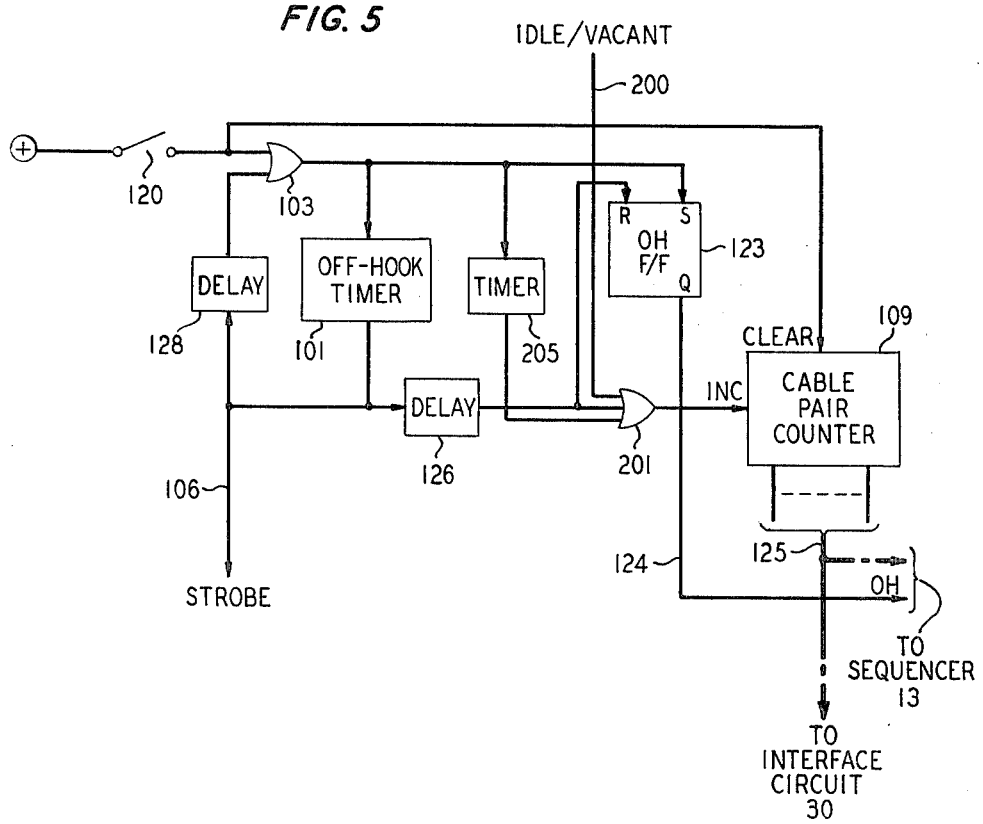
FIG. 5 is a more detailed circuit diagram of a common controller used in the assignment verification system of FIG. 4.

Referring more particularly to FIG. 5, there is shown a more detailed block diagram of the common controller 170 in FIG. 4. Again, the elements of FIG. 5 which are identical to elements of FIG. 2 have been indicated with the same reference numerals. Thus, a starting switch 120, when operated, connects an enabling voltage to OR gate 103 the output of which is connected to off-hook timer 101 and to a test timer 205. The signal from switch 120 is also used to clear cable pair counter 109. Test timer 205 performs a function similar to counter 202 in FIG. 2. That is, the delay period of timer 205 is many times greater than that of timer 101. Thus, if the line is busy for a sufficiently long time, timer 205 times out to provide an input signal to OR gate 201 to advance counter 109. Idle/vacant signals on lead 200 also operate through OR gate 201 to advance counter 109.

After off-hook timer 101 is triggered, following a timed period, an output signal is produced on output lead 106. The input to timer 101 is also applied to the "set" input of off-hook flip-flop 123, which, in response thereto, produces an output signal on lead 124 which initiates the off-hook simulation in sequencer 13. The output on lead 106 comprises the strobe signal applied to gate 29 and AND gates 156 through 157 in FIG. 4.

The signal on output lead 106 from timer 101 is also supplied through delay circuit 126 to reset flip-flop 123 (thus, removing the off-hook condition) and through OR gate 201 to increment counter 109 (thus, identifying the next sequential cable pair). The output of timer 101 is likewise supplied through delay circuit 128 to OR gate 103 to initiate a new cycle, using this new cable pair indication code.

The common controller of FIG. 5, like that of FIG. 2, serves to control the application of a simulated off-hook condition to all of the idle cable pair appearances connected to test shoe 12. The responding dial tone marker provides an identifiable tone on the cable pair appearance which tone is detected by one of the detectors 154 through 155 to operate the appropriate one of gates 152 through 153. In contrast to the embodiment of FIG. 1, the arrangement in FIG. 4 can proceed with cable pair-line equipment verification even during periods of heavy traffic in the central office. Of course, if all of the dial tone markers are busy, the verification system must wait until one of these markers goes idle before completing a verification cycle. This should occur in a reasonably brief period of time and verification can proceed as described. If not, timer 205 forces advancement to the next cable pair.

The cable pair-line equipment verification system of the present invention has been described in connection with a central office switching system utilizing dial tone markers. Such offices, such as the No. 5 crossbar offices described in the aforementioned Busch patent, are very common in the telephone system and therefore have been chosen for illustrative purposes. It is clear, however, that the principles of the present invention can be readily applied to other forms of common control central office switching systems with modifications which will be obvious to those of ordinary skill in the art.

I claim:

1. A method of verifying the assignment of cable pairs to line equipments in a telephone central office CHARACTERIZED BY the steps of automatically and sequentially simulating an off-hook condition on said cable pairs, detecting the identification of said line equipment connected to each of said cable pairs to which dial tone would normally be connected, and recording an identification of said cable pair and said identification of said line equipment.

2. The method according to claim 1 wherein said step of automatically simulating an off-hook condition is further CHARACTERIZED BY the step of timing said off-hook condition to be sustained for no more than a few hundred milliseconds.

3. The method according to claim 1 further CHARACTERIZED BY the step of performing said method of verifying only during periods of minimum traffic load on said telephone central office.

4. The method according to claim 1 further CHARACTERIZED BY the steps of identifying the active one of a plurality of dial tone markers providing said dial tone, and recording the line equipment verification only from said identified marker.

5. The method according to claim 3 further CHARACTERIZED BY the step of repeating said steps of simulating and detecting, but omitting said step of recording, whenever said step of detecting indicates the assignment of dial tone to more than one line equipment.

6. A cable pair-line equipment assignment verification system for telephone central offices CHARACTERIZED BY means for simulating an off-hook condition on one of said cable pairs, automatic means for sequentially connecting said simulating means to identified ones of a plurality of said cable pairs, means for identifying the particular line equipment responsive to said off-hook condition, and means, responsive to said identifying means, for recording the identification of said identified cable pair and said identified line equipment.

7. The assignment verification system according to claim 6 CHARACTERIZED IN THAT said recording means comprises a magnetic storage medium.

8. The assignment verification system according to claim 6 wherein said simulating means is CHARACTERIZED BY means for timing said off-hook simulation for a period no more than a few hundred milliseconds.

9. The assignment verification system according to claim 6 CHARACTERIZED BY means for skipping busy ones of said cable pairs.

10. The assignment verification system according to claim 9 further CHARACTERIZED BY means for reenabling said simulating means for the same identified cable pair.

11. The assignment verification system according to claim 6 further CHARACTERIZED BY cable pair counting means, and commutating means responsive to the output of said counting means for connecting said simulating means to said cable pairs.

12. The assignment verification system according to claim 6 CHARACTERIZED IN THAT said equipment number identifying means includes at least one tone source and a respective tone detector.

* * * * *